US011887767B2

(12) United States Patent
(10) Patent No.: US 11,887,767 B2
(45) Date of Patent: Jan. 30, 2024

Kodama et al.

(54) INDUCTOR BUILT-IN SUBSTRATE AND METHOD FOR MANUFACTURING THE SAME

(71) Applicant: IBIDEN CO., LTD., Gifu (JP)

(72) Inventors: Hiroaki Kodama, Ogaki (JP); Atsushi Ishida, Ogaki (JP); Kazuro Nishiwaki, Ogaki (JP)

(73) Assignee: IBIDEN CO., LTD., Ogaki (JP)

( * ) Notice: Subject to any disclaimer, the term of this patent is extended or adjusted under 35 U.S.C. 154(b) by 0 days.

(21) Appl. No.: 17/676,558

(22) Filed: Feb. 21, 2022

(65) Prior Publication Data

US 2022/0181064 A1 Jun. 9, 2022

Related U.S. Application Data

(63) Continuation of application No. 16/441,233, filed on Jun. 14, 2019, now Pat. No. 11,763,975.

(30) Foreign Application Priority Data

Jun. 15, 2018 (JP) ................................ 2018-114387

(51) Int. Cl.
*H01F 27/24* (2006.01)

(52) U.S. Cl.
CPC .................................... *H01F 27/24* (2013.01)

(58) Field of Classification Search
CPC ............... H01F 27/24; H01F 2017/002; H01F 2017/065; H01F 17/06; H01F 17/0013
See application file for complete search history.

(56) References Cited

U.S. PATENT DOCUMENTS

| | | | | |
|---|---|---|---|---|
| 5,949,030 | A | 9/1999 | Fasano et al. | |
| 7,812,702 | B2 | 10/2010 | Mano et al. | |
| 2006/0163740 | A1 | 7/2006 | Ohno et al. | |
| 2007/0256858 | A1 | 11/2007 | Kariya et al. | |
| 2007/0257761 | A1* | 11/2007 | Mano | H01F 17/0006 336/200 |
| 2009/0205202 | A1* | 8/2009 | Tanaka | H05K 1/185 29/834 |
| 2009/0294161 | A1* | 12/2009 | Yoshimura | H05K 3/4641 174/258 |
| 2010/0117779 | A1* | 5/2010 | Mano | H01F 17/06 336/200 |
| 2010/0218980 | A1 | 9/2010 | Furuta et al. | |
| 2011/0209905 | A1* | 9/2011 | Morita | H05K 1/0222 174/257 |
| 2014/0159851 | A1 | 6/2014 | Mano et al. | |
| 2014/0216800 | A1 | 8/2014 | Zanma et al. | |

(Continued)

FOREIGN PATENT DOCUMENTS

JP 2016-197624 A 11/2016

*Primary Examiner* — Mang Tin Bik Lian

(74) *Attorney, Agent, or Firm* — Oblon, McClelland, Maier & Neustadt, L.L.P.

(57) ABSTRACT

An inductor built-in substrate includes a core substrate having an opening and a first through hole, a first plating film formed in the first through hole of the core substrate, a magnetic resin body having a second through hole and including a magnetic resin filled in the opening of the core substrate, and a second plating film formed in the second through hole of the magnetic resin body such that the second plating film is formed in contact with the magnetic resin body.

20 Claims, 4 Drawing Sheets

(56) References Cited

U.S. PATENT DOCUMENTS

2015/0213946 A1* 7/2015 Mano .................... H01F 17/04
336/200
2019/0279806 A1* 9/2019 Darmawikarta .... H01F 27/2804

* cited by examiner

INDUCTOR BUILT-IN SUBSTRATE AND METHOD FOR MANUFACTURING THE SAME

CROSS-REFERENCE TO RELATED APPLICATIONS

The present application is a continuation of and claims the benefit of priority to U.S. patent application Ser. No. 16/441,233, filed Jun. 14, 2019, which is based upon and claims the benefit of priority to Japanese Patent Application No. 2018-114387, filed Jun. 15, 2018. The entire contents of these applications are incorporated herein by reference.

BACKGROUND OF THE INVENTION

Field of the Invention

The present invention relates to an inductor built-in substrate that has an inductor built therein and a method for manufacturing the inductor built-in substrate.

Description of Background Art

Japanese Patent Laid-Open Publication No. 2016-197624 describes a method for manufacturing an inductor component built in a wiring board. In Japanese Patent Laid-Open Publication No. 2016-197624, a magnetic material is accommodated in a resin layer, through-hole conductors are provided in the resin layer, and the through-hole conductors are prevented from being in contact with the magnetic material. The entire contents of this publication are incorporated herein by reference.

SUMMARY OF THE INVENTION

According to one aspect of the present invention, an inductor built-in substrate includes a core substrate having an opening, a magnetic resin body having a through hole and including a magnetic resin filled in the opening of the core substrate, and a plating film formed in the through hole of the magnetic resin body and including an electrolytic plating film such that the electrolytic plating film is formed in contact with the magnetic resin body.

According to another aspect of the present invention, an inductor built-in substrate includes a core substrate having an opening and a first through hole, a first plating film formed in the first through hole of the core substrate, a magnetic resin body having a second through hole and including a magnetic resin filled in the opening of the core substrate, and a second plating film formed in the second through hole of the magnetic resin body and including an electrolytic plating film such that the electrolytic plating film of the second plating film is formed in contact with the magnetic resin body.

According to yet another aspect of the present invention, a method for manufacturing an inductor built-in substrate includes forming an opening in a core substrate including a copper-clad laminated plate, forming a first through hole in the core substrate, filling a magnetic resin in the opening such that a magnetic resin body is formed in the opening of the core substrate, forming a second through hole in the magnetic resin body, forming a first electrolytic plating film such that the first electrolytic plating film is formed on first and second surfaces of the core substrate and first and second end portions of the magnetic resin body, and inside the second through hole of the magnetic resin body, forming a first electroless plating film such that the first electroless plating film is formed on the first electrolytic plating film and inside the first through hole of the core substrate, and forming a second electrolytic plating film such that the second electrolytic plating film is formed on the first electroless plating film.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE EMBODIMENTS

Figure 1A:
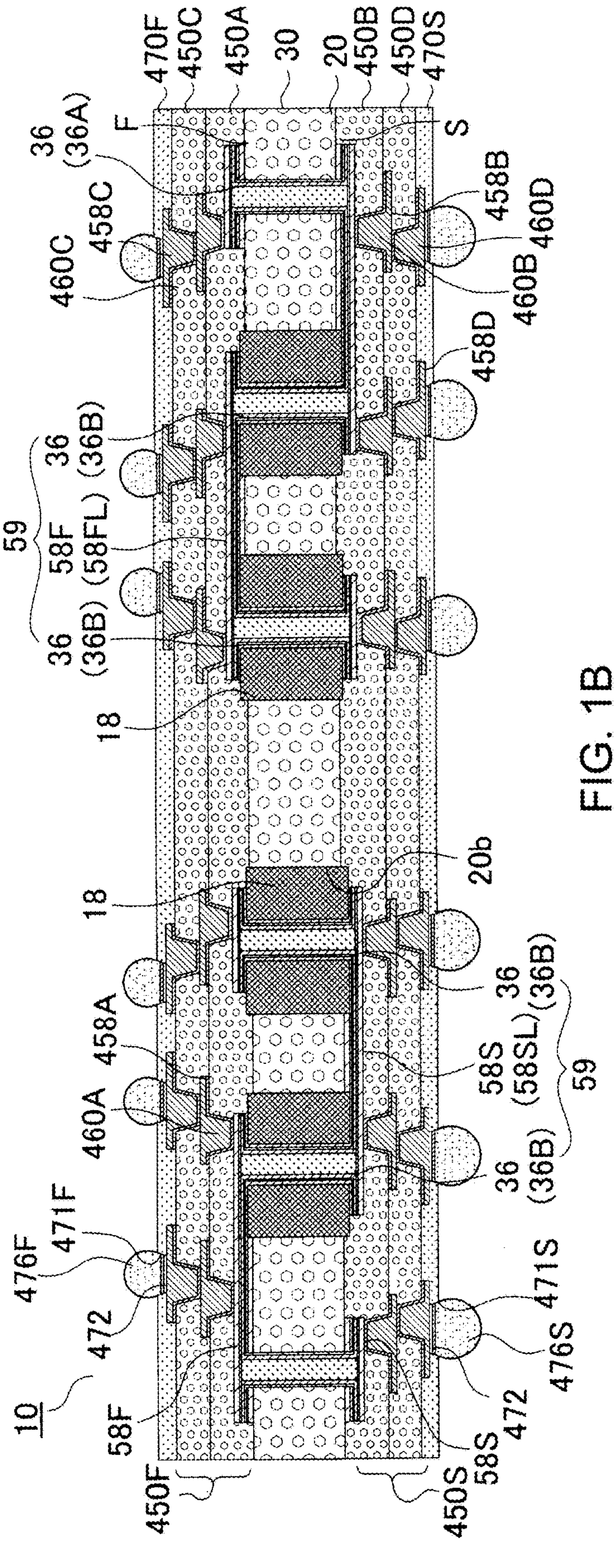
FIG. 1A is a cross-sectional view of an inductor built-in substrate of a first embodiment.

Embodiments will now be described with reference to the accompanying drawings, wherein like reference numerals designate corresponding or identical elements throughout the various drawings.

First Embodiment

FIG. 1A illustrates a cross-sectional view of an inductor built-in substrate 10 of a first embodiment that has an inductor built therein. The inductor built-in substrate 10 has a core substrate 30 that is formed to include: an insulating base material 20 that has a first surface (F) and a second surface (S) on an opposite side with respect to the first surface (F); a first conductor layer (58F) on the first surface (F) of the insulating base material; a second conductor layer (58S) on the second surface (S) of the insulating base material; and first through-hole conductors 36 that connect the first conductor layer (58F) and the second conductor layer (58S) to each other. The core substrate 30 has a first surface (F) and a second surface (S) on an opposite side with respect to the first surface (F). The first surface (F) of the core substrate 30 and the first surface (F) of the insulating base material 20 are the same surface, and the second surface (S) of the core substrate and the second surface (S) of the insulating base material are the same surface.

The inductor built-in substrate 10 further has an upper side build-up layer (450F) formed on the first surface (F) of the core substrate 30. The upper side build-up layer (450F) includes: an insulating layer (450A) formed on the first surface (F) of the core substrate 30; a conductor layer (458A) formed on the insulating layer (450A); and via conductors (460A) penetrating the insulating layer (450A) and connecting the first conductor layer (58F) and the through-hole conductors 36 to the conductor layer (458A). The upper side build-up layer (450F) further includes: an insulating layer (450C) formed on the insulating layer (450A) and the conductor layer (458A); a conductor layer (458C) formed on the insulating layer (450C); and via conductors (460C) penetrating the insulating layer (450C) and connecting the conductor layer (458A) and the via conductors (460A) to the conductor layer (458C).

The inductor built-in substrate 10 further has a lower side build-up layer (450S) formed on the second surface (S) of the core substrate 30. The lower side build-up layer (450S) includes: an insulating layer (450B) formed on the second surface (S) of the core substrate 30; a conductor layer (458B) formed on the insulating layer (450B); and via conductors (460B) penetrating the insulating layer (450B) and connecting the second conductor layer (58S) and the through-hole conductors 36 to the conductor layer (458B). The lower side build-up layer (450S) further includes: an insulating layer (450D) formed on the insulating layer (450B) and the conductor layer (458B); a conductor layer (458D) formed on the insulating layer (450D); and via conductors (460D) penetrating the insulating layer (450D) and connecting the conductor layer (458B) and the via conductors (460B) to the conductor layer (458D).

The inductor built-in substrate of the first embodiment further has a solder resist layer (470F) having openings (471F) formed on the upper side build-up layer (450F) and a solder resist layer (470S) having openings (471S) formed on the lower side build-up layer (450S).

Portions of the conductor layers (458C, 458D) exposed from the openings (471F, 471S) of the solder resist layers (470F, 470S) and upper surfaces of the via conductors (460C, 460D) function as pads. Protective films 472 each composed of Ni/Au, Ni/Pd/Au, Pd/Au, or OSP are respectively formed on each of the pads. Solder bumps (476F, 476S) are respectively formed on the protective films. An IC chip (not illustrated in the drawings) is mounted on the inductor built-in substrate 10 via the solder bumps (476F) formed on the upper side build-up layer (450F). The inductor built-in substrate 10 is mounted on a motherboard via the solder bumps (476S) that are formed on the lower side build-up layer (450S).

Figure 4A:
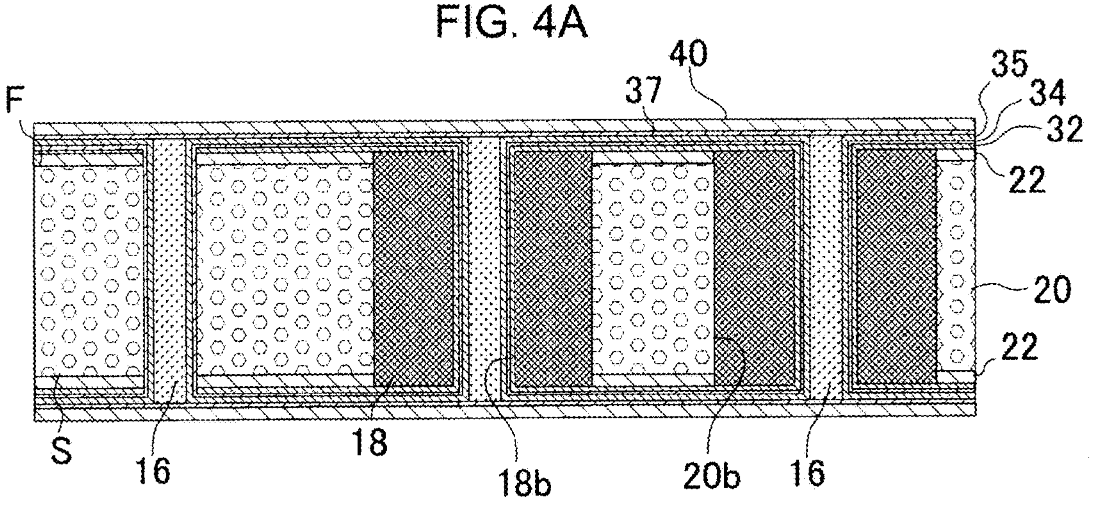
FIGS. 4A-4C are process diagrams illustrating the method for manufacturing the inductor built-in substrate according to the first embodiment.
Figure 4B:
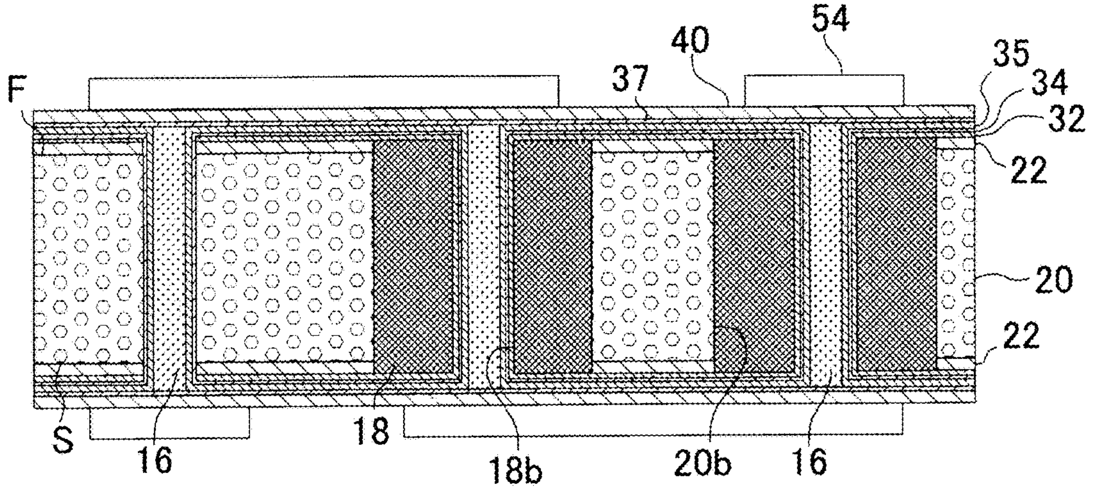
Figure 4C:
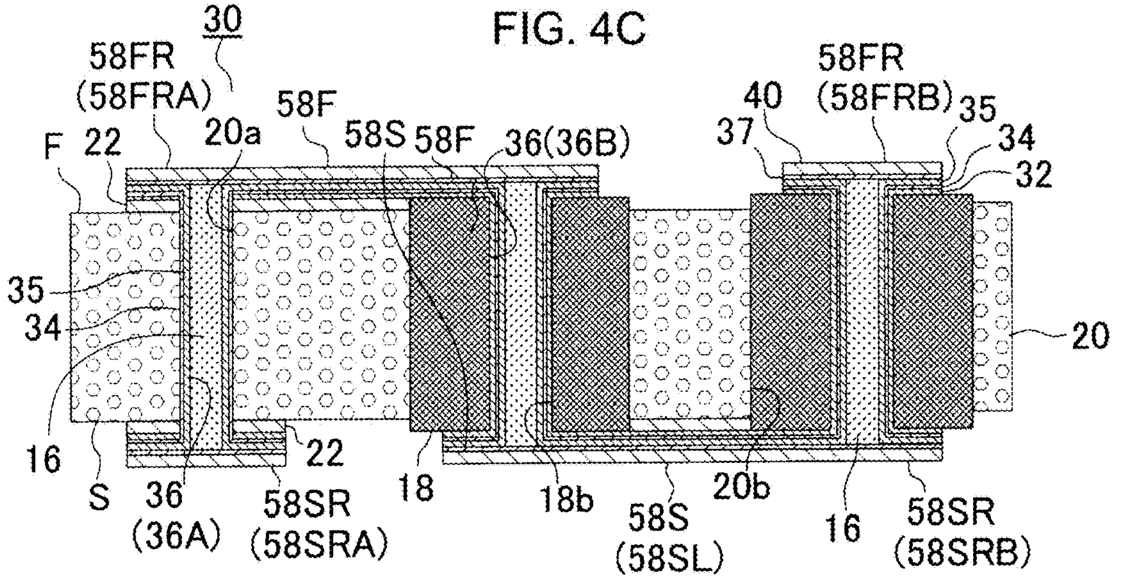

FIG. 4C illustrates an enlarged view of a portion of the core substrate 30 in FIG. 1A. In the core substrate 30, the through-hole conductors 36 connecting a first conductor pattern (58F) and a second conductor pattern (58S) to each other include first through-hole conductors (36A) that are formed in first through holes (20*a*) penetrating the core substrate 30 and second through-hole conductors (36B) that are formed in second through holes (18*b*) of a magnetic resin 18 filled in openings (20*b*) of the core substrate 30. A resin filler 16 is filled inside the first through-hole conductors (36A) and the second through-hole conductors (36B), and through-hole lands (58FR, 58SR) are formed of cover plating. The magnetic resin 18 contains an iron filler (magnetic particles) and a resin such as an epoxy resin. Examples of the magnetic particles include iron fillers such as iron oxide (III) particles, cobalt iron oxide particles, iron particles, silicon iron particles, magnetic alloy particles, and ferrite particles.

The first through-hole conductors (36A) formed in the first through holes (20*a*) penetrating the core substrate 30 are in contact with the first through holes (20*a*). The first through-hole conductors (36A) are formed by a first electroless plating film 34 as an innermost layer and a second electrolytic plating film 35 formed on the first electroless plating film 34. First surface side through-hole lands (58FRA) and second surface side through-hole lands (58SRA) of the first through-hole conductors (36A), the first conductor pattern (58F) and the second conductor pattern (58S) are formed by a copper foil 22 as a lowermost layer, a first electrolytic plating film 32 formed on the copper foil 22, a first electroless plating film 34 formed on the first electrolytic plating film 32, a second electrolytic plating film 35 formed on the first electroless plating film 34, a second electroless plating film 37 formed on the second electrolytic plating film 35, and a third electrolytic plating film 40 formed on the second electroless plating film 37.

The second through-hole conductors (36B) formed in the second through holes (18*b*) penetrating the magnetic resin 18 are in contact with the second through holes (18*b*). The second through-hole conductors (36B) are formed by a first electrolytic plating film 32 as an innermost layer, a first electroless plating film 34 formed on the first electrolytic plating film 32, and a second electrolytic plating film 35 formed on the first electroless plating film 34. First surface side through-hole lands (58FRB) and second surface side through-hole lands (58SRB) of the second through-hole conductors (36B) are formed by a first electrolytic plating film 32 as a lowermost layer, a first electroless plating film 34 formed on the first electrolytic plating film 32, a second electrolytic plating film 35 formed on the first electroless plating film 34, a second electroless plating film 37 formed on the second electrolytic plating film 35, and a third electrolytic plating film 40 formed on the second electroless plating film 37.

In the core substrate 30 of the first embodiment, the first conductor pattern (58F) (connection pattern (58FL)) and the second conductor pattern (58S) (connection pattern (58SL)) which are connected to each other via the second through-hole conductors (36B) formed in the magnetic resin 18 illustrated in FIG. 1A are formed in a helical shape (a spiral shape along an axis in a direction parallel to the front and back surfaces of the core substrate), and together with the second through-hole conductors (36B) form an inductor 59.

In the inductor built-in substrate 10 of the first embodiment, the first conductor pattern (58F) and the second conductor pattern (58S) are formed on the surfaces of the core substrate 30, and the second through-hole conductors (36B) connecting the first conductor pattern (58F) and the second conductor pattern (58S) to each other are directly formed in the second through holes (18*b*) penetrating the magnetic resin 18. Therefore, a ratio of a magnetic material in the inductor built-in substrate 10 is increased and an inductance can be increased. Further, since it is the first electrolytic plating film 32 that is in contact with the second through holes (18*b*) penetrating the magnetic resin 18, reliability is unlikely to decrease. That is, a composition of the magnetic resin 18 containing an iron filler changes when the magnetic resin 18 is exposed to a palladium catalyst which is used in a pretreatment of electroless plating, and reliability of connection to the electroless plating film decreases. In the embodiment, since the first electrolytic plating film 32 is directly formed on the magnetic resin, the reliability is unlikely to decrease.

Method for Manufacturing the Inductor Built-In Substrate of the First Embodiment A method for manufacturing the inductor built-in substrate of the first embodiment is illustrated in FIGS. 2A-4C.

Figures 2A, 2B, 2C, 2D, 2E:
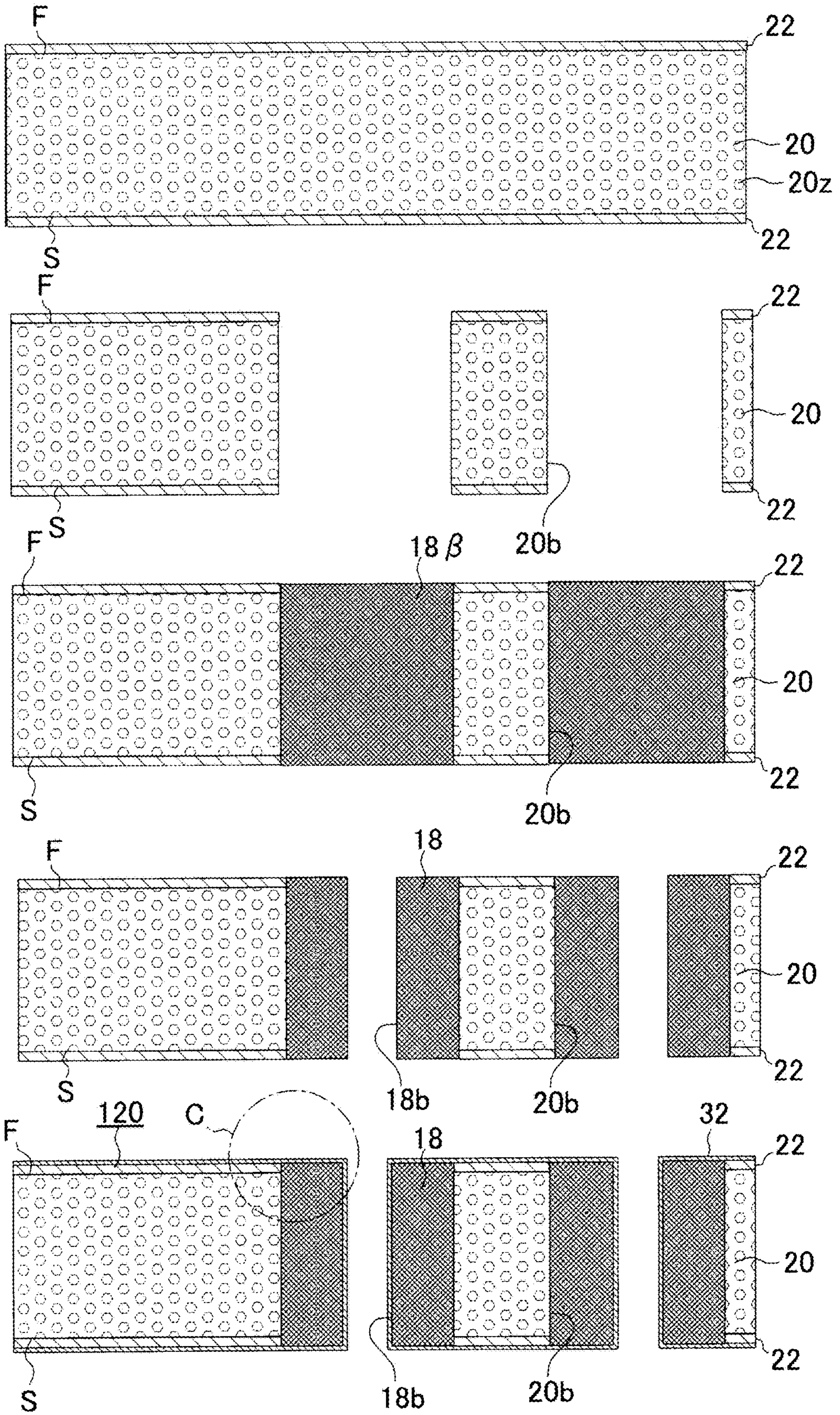
FIGS. 2A-2E are process diagrams illustrating a method for manufacturing the inductor built-in substrate according to the first embodiment.

A substrate (20*z*) is prepared which is formed of a copper-clad laminated plate which is formed by laminating a copper foil 22 on both sides of the insulating base material 20 (FIG. 2A). The openings (20*b*) for filling the magnetic resin therein are formed in the insulating base material 20 (FIG. 2B). A resin paste containing an iron filler (magnetic particles) at a ratio of 90% by weight and an epoxy resin is vacuum printed in the openings (20*b*). The resin paste is temporarily cured at a temperature at which a viscosity of the resin paste is 2 or less times that at a normal temperature, and a temporarily cured magnetic resin (18β) is formed (FIG. 2C). The second through holes (18*b*) are formed in the temporarily cured magnetic resin (18β) by mechanical drilling or laser processing. In this embodiment, since the iron filler is contained at a ratio of 90% by weight, through hole formation after curing is not easy. However, since the through holes are formed before curing, the through holes can be easily formed.

The magnetic material layer in a temporarily cured state is heated to cause the resin contained therein to crosslink, and thereby, the magnetic material layer is cured to form the magnetic resin 18 (FIG. 2D). Here, heating is performed at 150° C.-190° C. for one hour. By high pressure washing, processing smear occurred at the time of the through hole formation is removed. Desmearing is performed using an alkaline agent. However, there is a risk that an alkaline agent may cause the iron filler contained in the magnetic material to fall off during a process in which the resin is swelled and peeled off. Therefore, here, high-pressure water washing is performed. The first electrolytic plating film 32 is formed on the copper foil 22 on the surfaces of the insulating base material 20 and on inner walls of the second through holes (18*b*) by electrolytic plating, and an intermediary body 120 is completed (FIG. 2E).

Figure 1B:
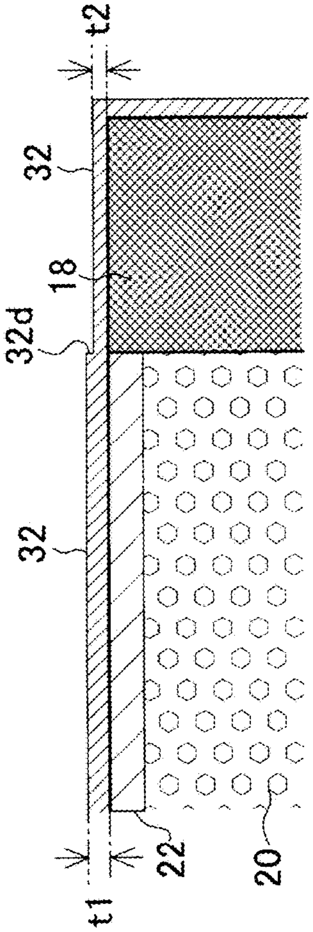
FIG. 1B is an enlarged view of the inductor built-in substrate.

FIG. 1B illustrates an enlarged view of inside of a circle (C) of the intermediary body 120 in FIG. 2E.

The first electrolytic plating film 32 is formed on the copper foil 22 of the insulating base material 20 and on surfaces of the magnetic resin 18. A thickness (t1) of the first electrolytic plating film 32 on the copper foil 22 is larger than a thickness (t2) of the first electrolytic plating film 32 on the surfaces of the magnetic resin 18. Then, the first electrolytic plating film 32 has a height difference (32*d*) at a boundary portion between the magnetic resin 18 and the copper foil 22.

Figure 3A:
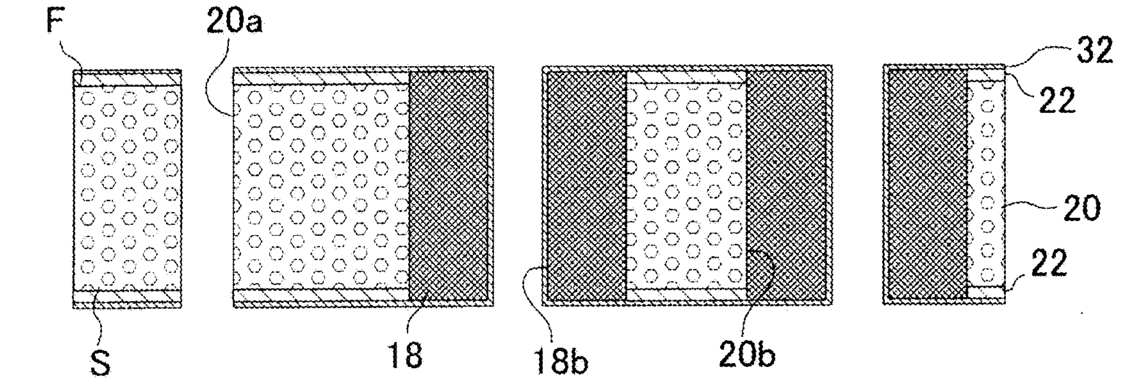
FIGS. 3A-3D are process diagrams illustrating the method for manufacturing the inductor built-in substrate according to the first embodiment.
Figure 3B:
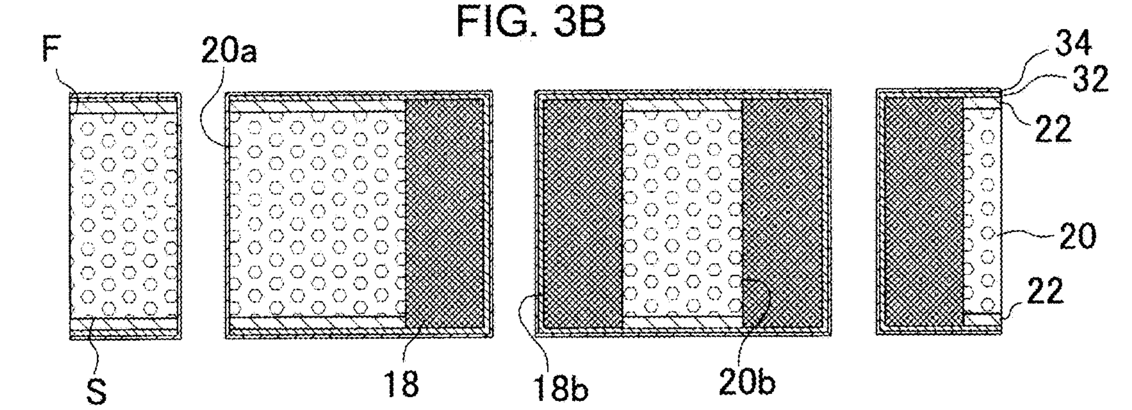
Figure 3C:
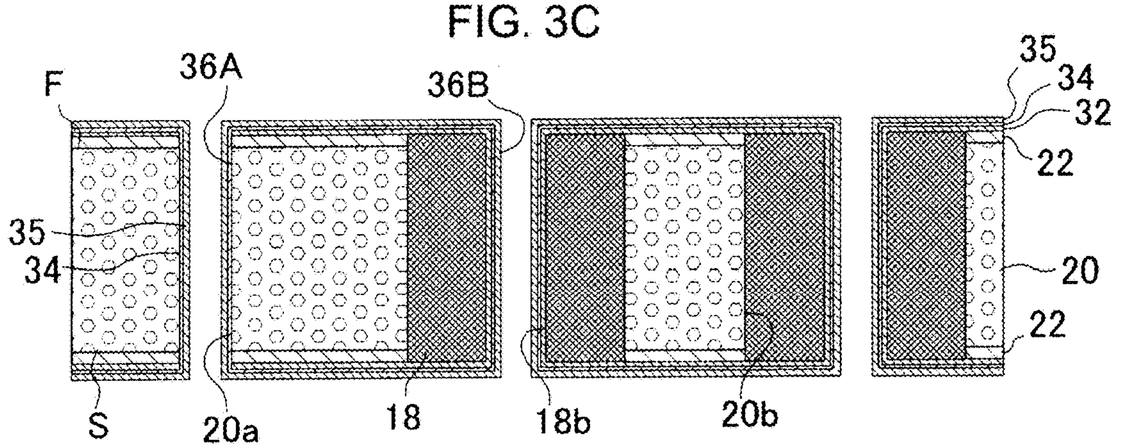

The first through holes (20*a*) are formed in the insulating base material 20 by mechanical drilling or laser processing (FIG. 3A). The first electroless plating film 34 is formed on a surface of the first electrolytic plating film 32 and in the first through holes (20*a*) by electroless plating (FIG. 3B). The second electrolytic plating film 35 is formed on the first electroless plating film 34 by electrolytic plating, the first through-hole conductors (36A) are formed on surfaces of the first through holes (20*a*), and the second through-hole conductors (36B) are formed on surfaces of the second through holes (18*b*) FIG. 3C). The first through-hole conductors (36A) formed in the first through holes (20*a*) are in contact with the first through holes (20*a*). That is, the first through-hole conductors (36A) are formed by the first electroless plating film 34 as an innermost layer and the second electrolytic plating film 35 formed on the first electroless plating film 34. The second through-hole conductors (36B) formed in the second through holes (18*b*) are in contact with the second through holes (18*b*). That is, the second through-hole conductors (36B) are formed by the first electrolytic plating film 32 as an innermost layer, the first electroless plating film 34 formed on the first electrolytic plating film 32, and the second electrolytic plating film 35 formed on the first electroless plating film 34.

Figure 3D:
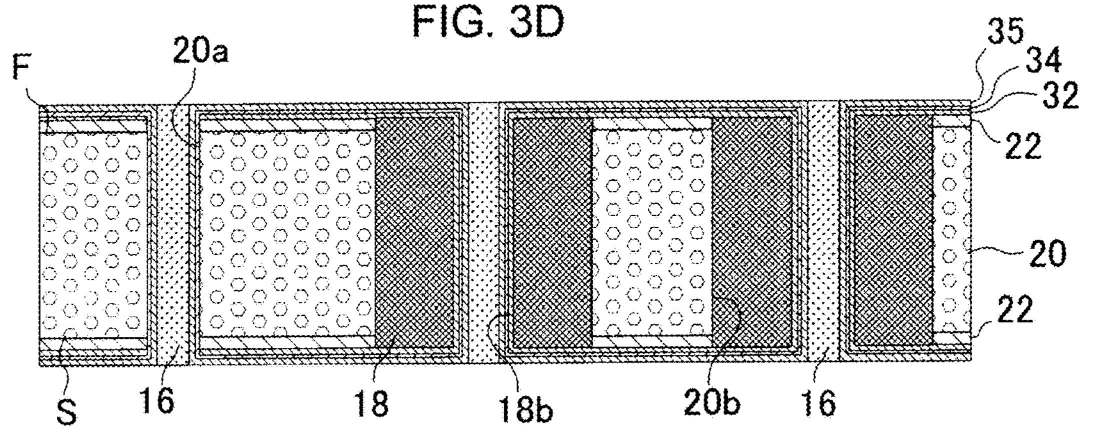

The resin filler 16 is filled inside the first through-hole conductors (36A) formed in the first through holes (20*a*) and inside the second through-hole conductors (36B) formed in the second through holes (18*b*), and the surfaces of the core substrate 30 are polished (FIG. 3D). The second electroless plating film 37 is formed on the second electrolytic plating film 35 and on exposed surfaces of the resin filler 16 by electroless plating, and the third electrolytic plating film 40 is formed on the second electroless plating film 37 (FIG. 4A). An etching resist 54 of a predetermined pattern is formed on the third electrolytic plating film 40 (FIG. 4B).

Portions of the third electrolytic plating film 40, the second electroless plating film 37, the second electrolytic plating film 35, the first electroless plating film 34, the first electrolytic plating film 32 and the copper foil 22 exposed from the etching resist 54 are removed, and after that, the etching resist is removed, and the first conductor pattern (58F) and the second conductor pattern (58S) are formed, and the core substrate 30 is completed (FIG. 4C). The first surface side through-hole lands (58FRA) and the second surface side through-hole lands (58SRA) of the first through-hole conductors (36A) and the connection pattern (58FL) and the connection pattern (58SL), which are included in the first conductor pattern (58F) and the second conductor pattern (58S), are formed by the copper foil 22 as a lowermost layer, the first electrolytic plating film 32 formed on the copper foil 22, the first electroless plating film 34 formed on the first electrolytic plating film 32, the second electrolytic plating film 35 formed on the first electroless plating film 34, the second electroless plating film 37 formed on the second electrolytic plating film 35, and the third electrolytic plating film 40 formed on the second electroless plating film 37. The first surface side through-hole lands (58FRB) and second surface side through-hole lands (58SRB) of the second through-hole conductors (36B), which are included in the first conductor pattern (58F) and the second conductor pattern (58S), are formed by the first electrolytic plating film 32 as a lowermost layer, the first electroless plating film 34 formed on the first electrolytic plating film 32, the second electrolytic plating film 35 formed on the first electroless plating film 34, the second electroless plating film 37 formed on the second electrolytic plating film 35, and the third electrolytic plating film 40 formed on the second electroless plating film 37.

The upper side build-up layer (450F), the lower side build-up layer (450S), the solder resist layers (470F, 470S), and the solder bumps (476F, 476S) may be formed on the core substrate 30 using common manufacturing methods (FIG. 1A).

In the method for manufacturing the inductor built-in substrate of the first embodiment, the first electrolytic plating film 32 is directly formed in second through holes (18*b*) of the magnetic resin 18. Therefore, a volume of the magnetic resin 18 of the inductor built-in substrate 10 can be increased, and the inductance can be increased. Further, since it is the first electrolytic plating film 32 that is in contact with the second through holes (18*b*) of the magnetic resin 18, the reliability is unlikely to decrease. Further, the first electrolytic plating film 32 is not formed after an electroless plating film. The first electrolytic plating film 32 is directly formed. Therefore, a manufacturing time can be shortened.

In Japanese Patent Laid-Open Publication No. 2016-197624, since the through-hole conductors are formed in the resin layer, it is thought that a ratio of the magnetic material with respect to a size of the inductor component is low and it is difficult to increase an inductance.

An inductor built-in substrate according to an embodiment of the present invention is small in size and has a large inductance, and another embodiment of the present invention is a method for manufacturing such an inductor built-in substrate.

An inductor built-in substrate according to an embodiment of the present invention includes: a core substrate in which an opening is formed; a magnetic resin that is filled in the opening and has a through hole; and a plating film formed in the through hole. Of the plating film, it is an electrolytic plating film that is in contact with the through hole.

An inductor built-in substrate according to another embodiment of the present invention includes: a core substrate in which an opening and a first through hole are formed; a magnetic resin that is filled in the opening and has a second through hole; a first plating film including multiple metal films formed in the first through hole; and a second plating film including multiple metal films formed in the second through hole. Of the second plating film, it is an electrolytic plating film that is in contact with the second through hole.

A method for manufacturing an inductor built-in substrate according to yet another embodiment of the present invention includes: forming an opening in a core substrate formed of a copper-clad laminated plate; filling a magnetic resin in the opening; forming a second through hole in the magnetic resin; forming a first electrolytic plating film on surfaces of the core substrate, on surfaces of the magnetic resin and in the second through hole; forming a first through hole in the core substrate; forming a first electroless plating film on the first electrolytic plating film and in the first through hole; and forming a second electrolytic plating film on the first electroless plating film.

In an inductor built-in substrate according to an embodiment of the present invention, since the plating film is directly formed in the through hole of the magnetic resin, a volume of a magnetic resin of an inductor component can be increased and an inductance can be increased. Since it is the electrolytic plating film that is in contact with the through hole of the magnetic resin, it is easy to obtain a uniform film thickness near an opening and in a middle portion of the through hole.

In a method for manufacturing an inductor built-in substrate according to an embodiment of the present invention, since the first electrolytic plating film is directly formed in the second through hole of the magnetic resin, a volume of a magnetic resin of an inductor component can be increased and an inductance can be increased. Since it is the first electrolytic plating film that is in contact with the second through hole of the magnetic resin, it is easy to obtain a uniform film thickness near an opening and in a middle portion of the through hole.

Obviously, numerous modifications and variations of the present invention are possible in light of the above teachings. It is therefore to be understood that within the scope of the appended claims, the invention may be practiced otherwise than as specifically described herein.

What is claimed is:

1. An inductor built-in substrate, comprising:
- a core substrate having an opening and a first through hole;
- a first copper foil formed on a first side of the core substrate;
- a first plating film formed in the first through hole of the core substrate;
- a second copper foil formed on a second side of the core substrate on an opposite side with respect to the first side;
- a magnetic resin body having a second through hole and comprising a magnetic resin filled in the opening of the core substrate; and
- a second plating film formed in the second through hole of the magnetic resin body such that the second plating film is formed in contact with the magnetic resin body,
- wherein the magnetic resin body is formed in the opening of the core substrate such that the magnetic resin is in direct contact with an inner wall of the core substrate in the opening, and the second plating film is formed such that the second plating film extends on first and second end portions of the magnetic resin body on the first and second sides of the core substrate respectively and extends on the first and second copper foils respectively, and that a thickness of the second plating film formed on the first and second copper foil is larger than a thickness of the second plating film formed on the first and second end portions of the magnetic resin body.

2. The inductor built-in substrate according to claim 1, wherein the first plating film comprises an electroless plating film and is formed such that the electroless plating film of the first plating film is formed in contact with the core substrate.

3. The inductor built-in substrate according to claim 1, wherein the second plating film includes an electroless plating film, and an electrolytic plating film formed on the electroless plating film.

4. The inductor built-in substrate according to claim 1, wherein the first plating film includes an electroless plating film forming an innermost layer, and an electrolytic plating film formed on the electroless plating film.

5. The inductor built-in substrate according to claim 1, wherein the magnetic resin body includes an iron filler.

6. The inductor built-in substrate according to claim 2, wherein the magnetic resin body includes an iron filler.

7. The inductor built-in substrate according to claim 3, wherein the magnetic resin body includes an iron filler.

8. The inductor built-in substrate according to claim 4, wherein the magnetic resin body includes an iron filler.

9. The inductor built-in substrate according to claim 1, wherein the second plating film is formed such that the second plating film has a height difference at a boundary portion between the first end portion of the magnetic resin body and the first copper foil and a height difference at a boundary portion between the second end portion of the magnetic resin body and the second copper foil.

10. The inductor built-in substrate according to claim 2, wherein the second plating film is formed such that the second plating film has a height difference at a boundary portion between the first end portion of the magnetic resin body and the first copper foil and a height difference at a boundary portion between the second end portion of the magnetic resin body and the second copper foil.

11. The inductor built-in substrate according to claim 3, wherein the second plating film is formed such that the second plating film has a height difference at a boundary portion between the first end portion of the magnetic resin body and the first copper foil and a height difference at a boundary portion between the second end portion of the magnetic resin body and the second copper foil.

12. The inductor built-in substrate according to claim 4, wherein the second plating film is formed such that the second plating film has a height difference at a boundary portion between the first end portion of the magnetic resin body and the first copper foil and a height difference at a boundary portion between the second end portion of the magnetic resin body and the second copper foil.

13. The inductor built-in substrate according to claim 9, wherein the magnetic resin body includes an iron filler.

14. The inductor built-in substrate according to claim 10, wherein the magnetic resin body includes an iron filler.

15. The inductor built-in substrate according to claim 11, wherein the magnetic resin body includes an iron filler.

16. The inductor built-in substrate according to claim 12, wherein the magnetic resin body includes an iron filler.

17. A method for manufacturing an inductor built-in substrate, comprising:

forming an opening in a core substrate comprising a copper-clad laminated plate;

forming a first through hole in the core substrate;

filling a magnetic resin in the opening such that a magnetic resin body is formed in the opening of the core substrate;

forming a second through hole in the magnetic resin body;

forming a first plating film in the first through hole of the core substrate;

forming a first copper foil on a first side of the core substrate;

forming a second copper foil on a second side of the core substrate on an opposite side with respect to the first side; and forming a second plating film in the second through hole of the magnetic resin body such that the second plating film is formed in contact with the magnetic resin body, wherein the magnetic resin body is formed in the opening of the core substrate such that the magnetic resin is in direct contact with an inner wall of the core substrate in the opening, and the second plating film is formed such that the second plating film extends on first and second end portions of the magnetic resin body on the first and second sides of the core substrate respectively and extends on the first and second copper foils respectively, and that a thickness of the second plating film formed on the first and second copper foil is larger than a thickness of the second plating film formed on the first and second end portions of the magnetic resin body.

18. The method for manufacturing an inductor built-in substrate according to claim 17, further comprising:

filling a filler in the first through hole of the core substrate and the second through hole of the magnetic resin body;

forming an electroless plating film such that the electroless plating film is formed on the core substrate;

forming an electrolytic plating film such that the electrolytic plating film is formed on the core substrate; and removing portions of the electroless plating film and the electrolytic plating film from the core substrate such that a circuit pattern is formed on the core substrate.

19. The method for manufacturing an inductor built-in substrate according to claim 17, wherein the forming of the second plating film includes forming an electroless plating film, and forming an electrolytic plating film on the electroless plating film.

20. The method for manufacturing an inductor built-in substrate according to claim 17, wherein the magnetic resin body includes an iron filler.

* * * * *